United States Patent
Raymond

(10) Patent No.: US 7,303,276 B2
(45) Date of Patent: Dec. 4, 2007

(54) FASTENING MECHANISM FOR EYEWEAR

(76) Inventor: Serge Raymond, 113 Place Lachance, Qc, Vanier (CA) G1M 2Y9

( * ) Notice: Subject to any disclaimer, the term of this patent is extended or adjusted under 35 U.S.C. 154(b) by 0 days.

(21) Appl. No.: 11/307,398

(22) Filed: Feb. 6, 2006

(65) Prior Publication Data

US 2007/0058129 A1    Mar. 15, 2007

(30) Foreign Application Priority Data

Sep. 15, 2005    (CA) .................................... 2518685

(51) Int. Cl.
*G02C 1/00*       (2006.01)
(52) U.S. Cl. .................. 351/158; 351/157; 24/905; 248/902
(58) Field of Classification Search .................. 351/41, 351/155, 158; 24/3.3, 3.5, 3.6, 3.7, 905; 248/309.1, 316.1, 316.5, 316.7, 902
See application file for complete search history.

(56) References Cited

U.S. PATENT DOCUMENTS

| | | | | |
|---|---|---|---|---|
| 3,956,813 A | * | 5/1976 | Shigeno | 29/768 |
| 5,794,312 A | * | 8/1998 | O'Mahony | 24/3.3 |
| 5,860,191 A | * | 1/1999 | Sieger | 24/3.3 |
| 5,956,812 A | * | 9/1999 | Moennig | 24/3.3 |
| D420,896 S | * | 2/2000 | Blackburn et al. | D8/395 |
| 6,134,753 A | * | 10/2000 | O'Mahony | 24/3.3 |
| 6,598,268 B1 | | 7/2003 | Zelman | |

* cited by examiner

*Primary Examiner*—Huy Mai
(74) *Attorney, Agent, or Firm*—Equinox Protection Inc.; Franz Bonsang, Patent Agent

(57) ABSTRACT

A fastening mechanism for fastening eyewear, such as spectacles or clip-on lenses, to clothing has a first and second clips pivotally connected by a pivot. The first clip has jaws is for gripping the eyewear on extremities of pivotally connected respective first and second jaws thereof. The second clip has jaws is for gripping the clothing on extremities of pivotally connected respective first and second jaws thereof. The pivot connects the first lever of the first clip to one of the levers of the second clip, and is situated generally longitudinally opposite the extremities of the first clip, thereby permitting the clips to be freely pivoted relative one another by gravity to suspend the jaws of the first clip, and thereby the eyewear, below the pivot. The jaws of the first clip have cushions which abuttingly contact the eyewear when gripped by the jaws of the first clip.

15 Claims, 4 Drawing Sheets

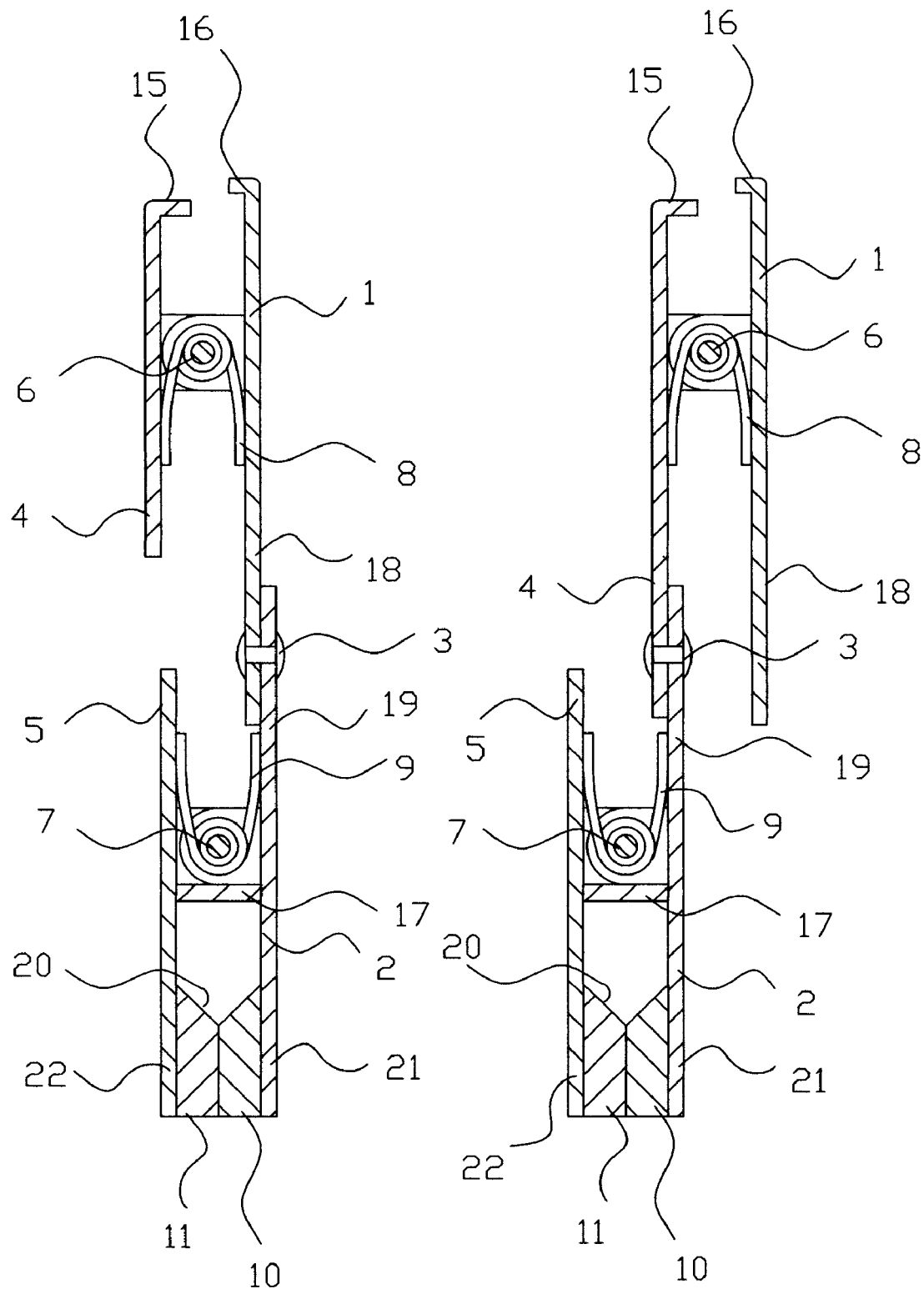

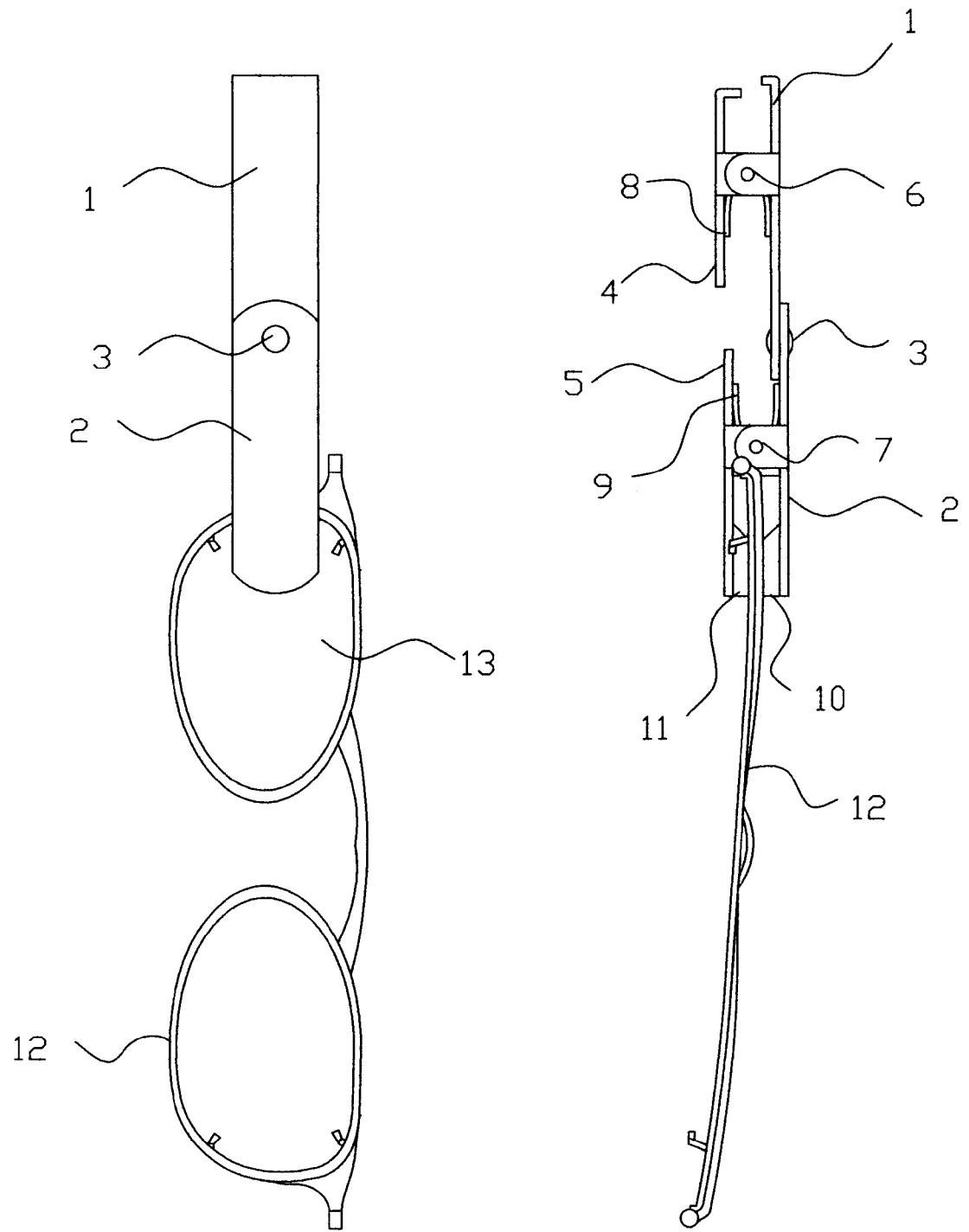

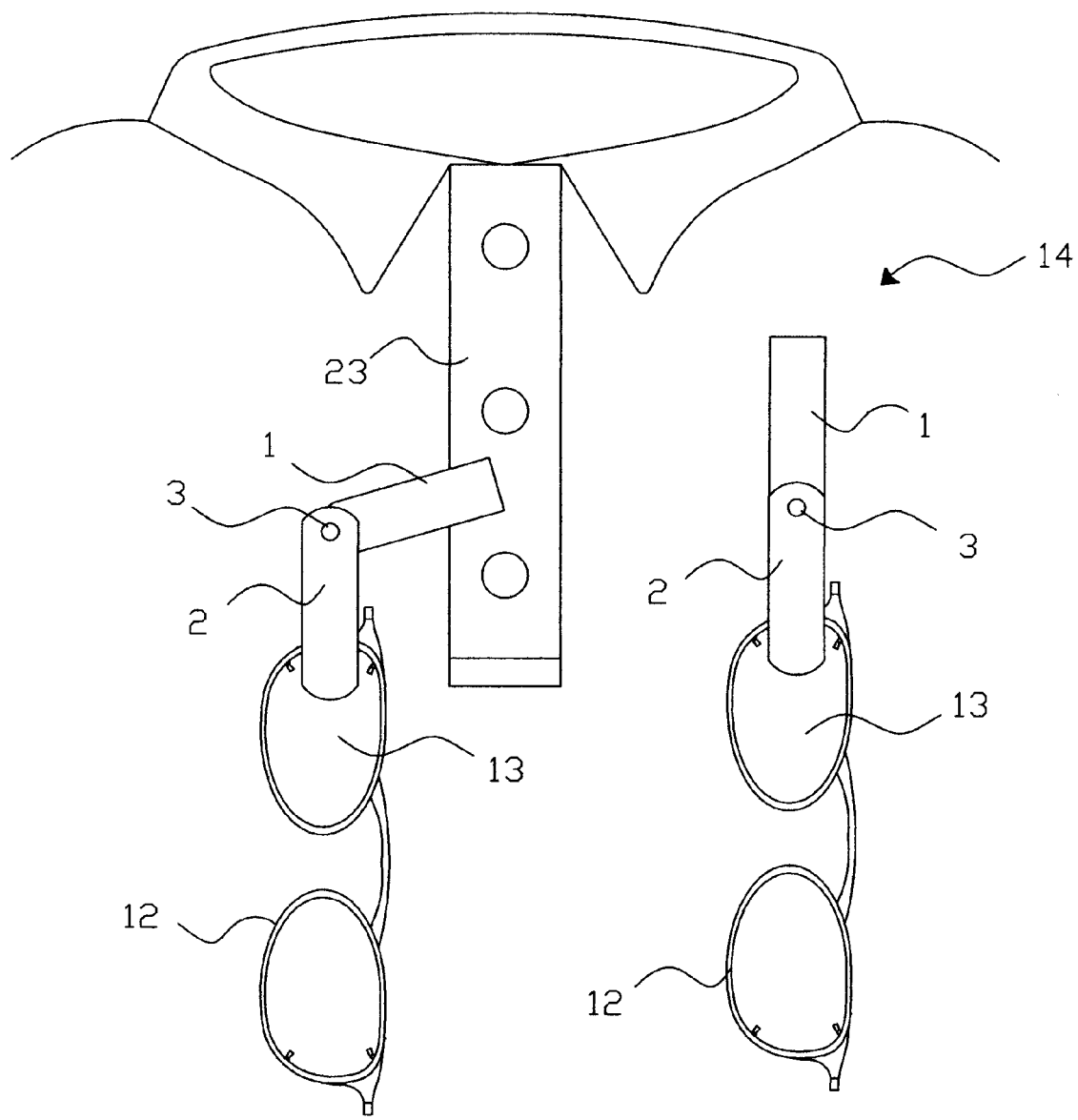

FASTENING MECHANISM FOR EYEWEAR

FIELD OF THE INVENTION

The present on invention relates to fastening mechanisms for eyewear, and is more particularly directed to a fastening mechanism for fastening eyewear to clothing.

BACKGROUND AND SUMMARY OF THE INVENTION

According to an aspect of the present, invention, there is provided a fastening mechanism for attaching an eyewear object to clothing, the mechanism comprises: first and second clips, each clip having pivotally connected respective first and second elongated levers, the respective first and second levers having respective jaws disposed one over the other, the respective jaws of the first clip gripping the eyewear object and the respective jaws of the second clip gripping the clothing, each respective jaw of each respective lever being situated on a respective first longitudinal extremity thereof; and an articulated pivot pivotally connecting the respective first lever of the first clip to one of the respective first and second levers of the second clip, the pivot being disposed on the respective first lever of the first clip on a respective second longitudinal extremity thereof generally longitudinally opposite the first respective longitudinal extremity thereof, the first clip being freely rotatable relative the second clip on the pivot by an effect of gravity which maintains the respective jaws of the first clip, and thereby the eyewear object, suspended below said pivot.

The invention is particularly useful and secure for the transportation of auxiliary sunglasses of the type clip-on or spectacles designed without arms extending from a lens frame for support over the ear. Because said arms are non-existent, transportation options are therefore limited, as the arms cannot be used to hook and suspend the spectacles to one's apparel. In addition, the invention, allowing the spectacles to be held by the lens, avoids the use of an integrated apparel pocket, said pocket posing risks of loss of the spectacles by sliding or, damage by compression or by friction against other solid objects contained within the pocket.

The invention consists of a rapid removable fastening mechanism for corrective eyeglasses, or auxiliary sunglasses of the type clip-on, or other objects similar in nature, and clothing. Two spring-loaded clips, joined in opposite directions by the ends of their respective levers, characterize the said mechanism. The said levers are superimposed and joined by an articulated pivot on a transversal axis to the levers of the said clips. The said pivot joining the two clips allows the clip for the spectacles to maintain a relatively vertical position, by the effect of gravity, independent of the position of the clip for the clothing.

One of the spring-loaded clips is designed to attach firmly onto the clothing, while the other spring-loaded clip is designed to grip the spectacles with the assistance of two small cushions made of rubber or plastic material. The said cushions affixed to the extremities of the jaws have for their roles to procure a rapid and secure attachment when applying pressure on either side of the lens, the glass, or the arm of the frame.

BRIEF DESCRIPTION OF THE DRAWINGS

FIG. 2 is a vertical cross section of the mechanism,

FIG. 3 is vertical cross section of the mechanism, according to a variation of the assembly of the clip for clothing with the clip for the spectacles, FIG. 4 is a frontal view of the mechanism, the spectacles inserted within the cushioned clips, FIG. 5 is profile view, the spectacles inserted within the cushioned clips, FIG. 6 is a frontal view, the spectacles inserted within the cushioned clips and the clip for clothing attached to the button border strip of a polo shirt, FIG. 7 is a frontal view, the spectacles inserted within the cushioned clips and the clip for clothing being suspended in a vertical position on a polo shirt.

DETAILED DESCRIPTION OF THE INVENTION

Figure 1:
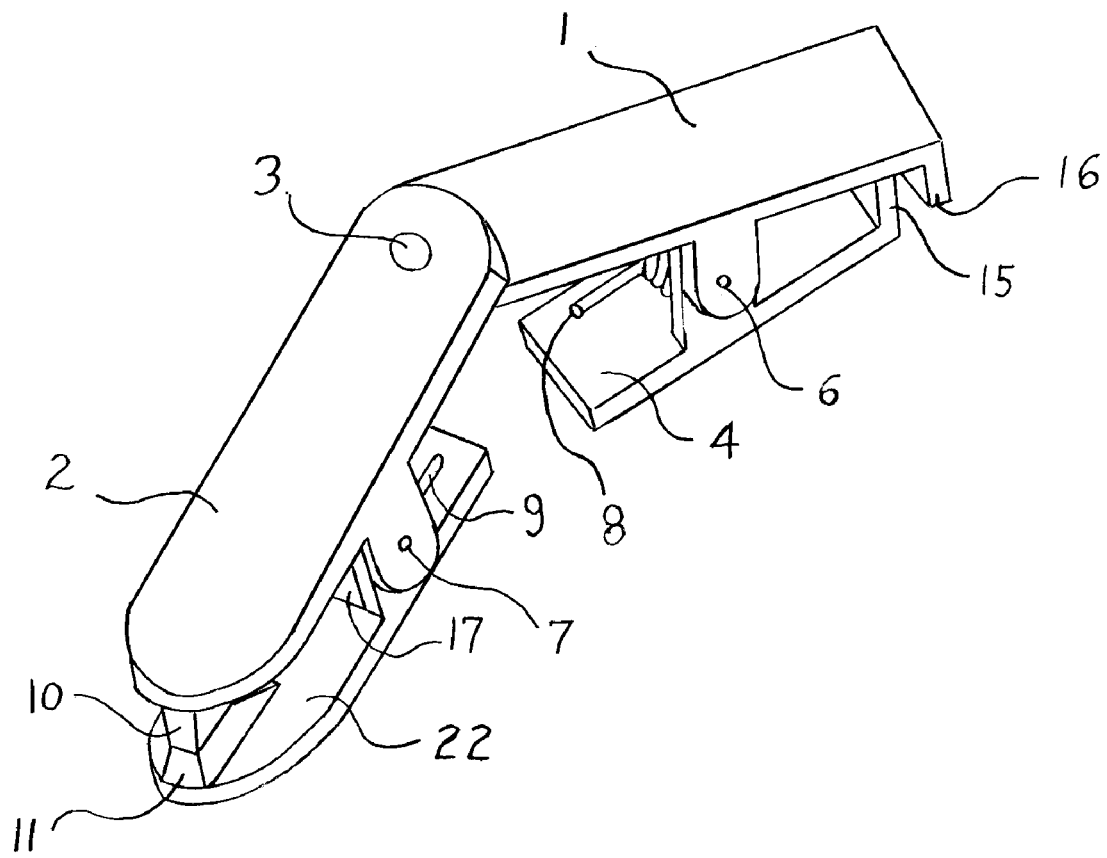
FIG. 1 is a perspective view of a mechanism according to the present invention.

By referring to the diagrams, one will note that the mechanism is composed of tow clips, either the clip shown in FIG. 6 for clothing 1 and the hinged cushioned clip for spectacles in FIG. 7 that are connected by an articulated pivot, the axis of which is transversal to the upper lever 18.

It can be determined that the connection is achieved by the upper lever 18 of the clip for clothing and the upper lever 19 of the cushioned clip 2. The said upper levers 18 and 19 are longer than the respective lower levers 4 and 5, with the aim of creating a separation required to action liberally each of the clips mounted in opposite directions.

It can be observed that the said pivot 3 connecting the clips one to the other permits the articulation of the clip for clothing 1 and the clip for the spectacles 2 according to several variations such as in using the upper lever of the clip for clothing 18 with the upper lever of the clip for spectacles 19 (FIG. 2), or again the lower lever of the clip for clothing 4 with the lower lever of the clip for spectacles 5, or else, using the lower lever of the clip for clothing 4 with the upper lever of the clip for spectacles 19 (FIG. 3), or the upper lever of the clip for clothing 18 with the lower lever of the clip for spectacles 5.

It can also be seen that the pressure on the upper jaw 16 exercised against the lower jaw 15 is achieved by a helical or coil spring 8, or other, such as a leaf spring. The said spring 8 exercises pressure on the interior surface of the lower lever 4 and on the interior surface of the lever 18, which permits the jaws to close themselves again and to create a solid hold on the clothing (FIGS. 5 and 6). Also, it can be noticed that the pressure exercised on the upper cushion 10 against the lower cushion 11 is achieved by a helical or coil spring 9, or other, such as a leaf spring.

The said spring 9 exercises a pressure on the interior surface of the lower lever 5 and on the interior surface of the upper lever 19, which permit the jaws outfitted with the upper cushion 10 and the lower cushion 11 to close themselves again and to create a solid hold on the spectacles 12 (FIG. 4). The said cushions permit gripping the spectacles by the glass 12 (FIGS. 4 and 5) the lens or an arm of the frame.

By referring to the diagrams, in particular in FIG. 6, it can be observed that the clip for clothing 1 permits a relatively horizontal attachment to the shirt 14, when using for example, the button border strip 23 (FIG. 6). In addition, the said clip for clothing 1 permits to suspend the appendage in a vertical position on a shirt 14 (see FIG. 7). The said pivot 3 maintains the spectacles 12 by the cushioned clip 2 in a horizontal position by, the effect of gravity, independent of the position of the clip for the clothing 1 (FIG. 6).

It can also be observed that the upper cushion 10 and the lower cushion 11 are affixed respectively to the extremity of the upper jaw 21 and to the extremity of the lower jaw 22 of the clip for spectacles 2. The said upper cushion 10 and lower 11 each have a bevelled side 20, the said side 20 facing the hinge 7 with the objective of facilitating the extraction of the spectacles 12.

Finally, it can be observed that the cushioned clip 2 intended to grip the spectacles 12 has a stop 17 made of rubber or plastic material, the said stop 17 joined to the hinge 7 is intended to, firstly, avoid that the spectacles come into direct contact with other parts of the clip such as the hinge 7 and, secondly, to indicate that the spectacles 12 are sufficiently inserted and secured within the clip 2, once the said spectacles 12 are pushed against the stop 17.

What is claimed is:

1. A fastening mechanism for attaching an eyewear object to clothing, said mechanism comprising:
    first and second clips, each clip having pivotally connected respective first and second elongated levers, said respective first and second levers having respective jaws disposed one over the other, said respective jaws of said first clip gripping the eyewear object and said respective jaws of said second clip gripping the clothing, each respective jaw of each respective lever being situated on a respective first longitudinal extremity thereof; and
    an articulated pivot pivotally connecting said respective first lever of said first clip to one of said respective first and second levers of said second clip, said pivot being disposed on the respective first lever of said first clip on a respective second longitudinal extremity thereof generally longitudinally opposite said first respective longitudinal extremity thereof, said first clip being freely rotatable relative said second clip on said pivot by an effect of gravity which maintains said respective jaws of said first clip, and thereby the eyewear object, suspended below said pivot.

2. The fastening mechanism of claim 1, further comprising, for said respective jaws of said first clip, respective cushions affixed to respective interior surfaces thereof, said interior surfaces facing one another, in proximity to said respective first longitudinal extremities thereof, said interior surfaces configured for abutting contact with the eyewear object when the eyewear object is gripped by said jaws.

3. The fastening mechanism of claim 2, wherein said respective cushions are comprised of a rubber material.

4. The fastening mechanism of claim 2, wherein said respective cushions are comprised of a plastic material.

5. The fastening mechanism of claim 2, wherein each respective cushion has a bevelled side facing oppositely away from said respective first longitudinal extremity where said respective jaw is situated and slanting away from said respective interior surface towards said respective first longitudinal extremity.

6. The fastening mechanism of claim 2, wherein the eyewear object is a piece of eyewear having at least one lens, said respective cushions being configured for abutting contact with the lens when the eyewear object is gripped by said respective jaws of said first clip.

7. The fastening mechanism of claim 1, further comprising a respective hinge for said first clip, said respective hinge of said first clip pivotally connecting said respective first and second levers of said first clip.

8. The fastening mechanism of claim 7, further comprising a stop joined to said respective hinge of said first clip and positioned between said respective hinge and said respective first longitudinal extremity of said respective first lever of said first clip, said stop being configured for impeding the eyewear object from coming into contact with said hinge.

9. The fastening mechanism of claim 8, wherein said stop is comprised of a rubber material.

10. The fastening mechanism of claim 8, wherein said stop is comprised of a plastic material.

11. The fastening mechanism of claim 1, further comprising a respective hinge for said second clip, said respective hinge of said second clip pivotally connecting said respective first and second levers of said second clip.

12. The fastening mechanism of claim 11, wherein said respective hinge comprises a respective spring which exerts a pressure on said respective levers of said first clip, said pressure closing said respective jaws on the eyewear object until the eyewear object is gripped thereby, said respective jaws thereby gripping the eyewear object, until an opposing pressure applied to said respective levers separates said respective jaws for removing the eyewear object therefrom or placing the eyewear object therebetween.

13. The fastening mechanism of claim 12, wherein said respective spring is a coil spring.

14. The fastening mechanism of claim 11, wherein said respective hinge comprises a respective spring which exerts a pressure on said respective levers of said second clip, said pressure closing said respective jaws on the eyewear object until the eyewear object is gripped thereby, said respective jaws thereby gripping the eyewear object, until an opposing pressure applied to said respective levers separates said respective jaws for removing the eyewear object therefrom or placing the eyewear object therebetween.

15. The fastening mechanism of claim 14, wherein said respective spring is a coil spring.

\* \* \* \* \*